A. R. TUFTS.
MOLLIFIER OR COMFORTER.
APPLICATION FILED JUNE 6, 1916.

1,236,235.

Patented Aug. 7, 1917.

INVENTOR.
ANDREW R. TUFTS.
BY Featherstonhaugh & Co.
ATT'YS.

UNITED STATES PATENT OFFICE.

ANDREW R. TUFTS, OF VANCOUVER, BRITISH COLUMBIA, CANADA.

MOLLIFIER OR COMFORTER.

1,236,235.  Specification of Letters Patent.  Patented Aug. 7, 1917.

Application filed June 6, 1916. Serial No. 102,062.

*To all whom it may concern:*

Be it known that I, ANDREW R. TUFTS, a subject of the King of Great Britain, and a resident of the city of Vancouver, in the Province of British Columbia, Canada, have invented certain new and useful Improvements in Mollifiers or Comforters, of which the following is a specification.

My invention relates to improvements in mollifiers or comforters, and has for its object the provision of a permanently resilient teat for baby soothers or pacifiers. A further object is to provide such a device as above mentioned which maintains its designed shape under any conditions and which is capable of being sterilized repeatedly without detriment or deterioration.

I attain these objects by the means illustrated in the accompanying drawings in which—

Figures 1, 2:
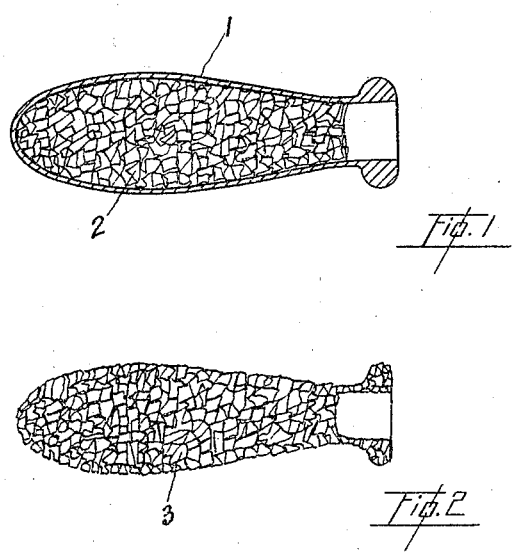
Figure 1 is a sectional view of a comforter, embodying my invention.
Fig. 2 is a view illustrating the cellular rubber core prior to coating with rubber solution.

In such devices as have hitherto been used for the purpose such as above described, or analogous thereto, a hollow envelop or casing, generally of rubber, and filled with air, cotton waste, cotton tow, flock, gelatinous material, or the like, has been employed, but it is found that, where waste, tow, flock or the like is used, such a filling invariably becomes hard and lumpy, so that the device is rendered useless for mollifying pain, and, further, the casing is liable to be bitten through or broken. Also, in baby soothers of this nature, if the teat becomes hard or lumpy, its continued use renders the gums sore and tends to set up inflammation of the mucous membrane in the mouth, or the teeth of the child may be pulled out of place, in fact, protruding teeth may be directly traceable in many cases to this cause.

Where the teat is filled with air, perforation of the outer casing allows the air to escape so that the device collapses and flattens and loses its resiliency, after which it is of no further use, and similarly, if the filling is of gelatinous material, perforation or breaking of the outer casing allows the mixture to ooze out, which occurrence, besides rendering the device useless, is unsanitary and uncomfortable, and in the case of a teat, may be injurious to the health of the child if the mixture is not chemically pure.

In order to overcome these disadvantages and defects I preferably take the cellular rubber, form it to the desired shape as indicated at 3 in Fig. 2, and then dip it into a transparent rubber solution so that a skin of rubber incloses the cellular rubber core.

It will now be seen that the inherent resiliency of the cellular rubber filling or core will maintain the device permanently in its designed formation so that, although it may flatten temporarily under pressure, it will retain its softness and spring out to its normal shape immediately the pressure is relieved, and under no circumstances can it become hard or lumpy, thus rendering the device highly efficient and of lasting utility. The peculiar softness of the rubber filling prevents irritation of the mouth and gums, enables the teat to yield under pulling strain so that protruding teeth are avoided, allows it to accommodate itself to irregular spaces or ridges in the jaws without undue pressure on the gums, and, as the rubber filling stretches uniformly with the outer casing, the risk of breaking or pulling the casing apart is eliminated. Further, it is practically impossible for such a teat to be bitten through, and therefore it is much more durable than any of the forms in present use.

Again, it will be apparent that a comforter such as described, may be kept sterilized and thoroughly sanitary, as it may be immersed in the sterilizing fluid time after time without the slightest detrimental effect on the filling.

What I claim as my invention is:

A process of making a teat for baby soothers comprising dipping a core of cellular rubber into a solution of liquid rubber to form a coating upon the core.

Dated at Vancouver, B. C., this 28th day of April, 1916.

ANDREW R. TUFTS.

Copies of this patent may be obtained for five cents each, by addressing the "Commissioner of Patents, Washington, D. C."